(12) United States Patent
Rosenthal et al.

(10) Patent No.: US 7,555,456 B2
(45) Date of Patent: Jun. 30, 2009

(54) METHOD AND SYSTEM FOR PROVIDING ELECTRONIC INFORMATION FOR MULTI-MARKET ELECTRONIC TRADING

(75) Inventors: Leslie Rosenthal, Chicago, IL (US); J. Robert Collins, Burr Ridge, IL (US)

(73) Assignee: Rosenthal Collins Group, LLC, Chicago, IL (US)

(*) Notice: Subject to any disclaimer, the term of this patent is extended or adjusted under 35 U.S.C. 154(b) by 557 days.

(21) Appl. No.: 11/147,949

(22) Filed: Jun. 8, 2005

(65) Prior Publication Data

US 2005/0273421 A1    Dec. 8, 2005

Related U.S. Application Data

(60) Provisional application No. 60/578,225, filed on Jun. 8, 2004.

(51) Int. Cl.
   *G06Q 40/00* (2006.01)
(52) U.S. Cl. .......................................... 705/37; 705/38
(58) Field of Classification Search ............... 705/35, 705/37–38
   See application file for complete search history.

(56) References Cited

U.S. PATENT DOCUMENTS

| | | |
|---|---|---|
| 5,038,284 A | 8/1991 | Kramer |
| 5,136,501 A | 8/1992 | Silverman |
| 5,168,446 A | 12/1992 | Wiseman |
| 5,297,031 A | 3/1994 | Gutterman |
| 5,412,769 A | 5/1995 | Maruoka et al. |
| 5,600,346 A | 2/1997 | Kamata et al. |
| 5,704,050 A | 12/1997 | Redpath |
| 5,774,877 A | 6/1998 | Patterson et al. |
| 5,796,402 A | 8/1998 | Ellison-Taylor |
| 5,799,151 A | 8/1998 | Hoffer |
| 5,835,090 A | 11/1998 | Clark et al. |
| 5,873,071 A | 2/1999 | Ferstenberg |
| 5,915,245 A | 6/1999 | Patterson |
| 5,924,083 A | 7/1999 | Silverman et al. |
| 5,977,973 A | 11/1999 | Sobeski et al. |
| 6,014,643 A | 1/2000 | Minton |
| 6,016,483 A | 1/2000 | Rickard |
| 6,029,146 A | 2/2000 | Hawkins |
| 6,058,378 A | 5/2000 | Clark et al. |
| 6,058,379 A | 5/2000 | Odom |
| 6,209,004 B1 | 3/2001 | Taylor |

(Continued)

OTHER PUBLICATIONS

GL Trade, LIFFE Connect for Futures, User Guide, V 4.50 Beta, Jan. 1999.

(Continued)

*Primary Examiner*—Thu Thao Havan
(74) *Attorney, Agent, or Firm*—Lesavich High-Tech Law Group, P.C.; Stephen Lesavich (57) ABSTRACT

A method and system for providing electronic information for multi-market electronic trading. The method and system dramatically improve an infrastructure used by electronic traders over a communications network by separating one or more data streams from one or more trading exchange with plural different types of electronic trading information into plural separate data streams that can be selected and displayed by a user on a target device. The plural separate data streams and can be requested, displayed and used faster and more efficiently than an entire data stream including all the multiple types of electronic trading information.

22 Claims, 6 Drawing Sheets

U.S. PATENT DOCUMENTS

| | | |
|---|---|---|
| 6,211,880 B1 | 4/2001 | Impink |
| 6,317,728 B1 | 11/2001 | Kane |
| 6,343,278 B1 | 1/2002 | Jain |
| 6,408,282 B1 | 6/2002 | Buist |
| 6,418,419 B1 | 7/2002 | Nieboer |
| 6,421,653 B1 | 7/2002 | May |
| 6,505,175 B1 | 1/2003 | Silverman |
| 6,519,574 B1 | 2/2003 | Wilton |
| H2064 H | 5/2003 | Buchalter |
| 6,615,188 B1 | 9/2003 | Breen |
| 6,625,583 B1 | 9/2003 | Silverman |
| 6,766,304 B2 | 7/2004 | Kemp, II |
| 6,772,132 B1 | 8/2004 | Kemp, II |
| 6,850,907 B2 | 2/2005 | Lutnick |
| 6,868,400 B1 | 3/2005 | Sundaresan |
| 6,892,186 B1 | 5/2005 | Preist |
| 6,938,011 B1 | 8/2005 | Kemp, II |
| 6,963,856 B2 | 11/2005 | Lutnick |
| 6,993,504 B1 | 1/2006 | Friesen |
| 6,996,540 B1 | 2/2006 | May |
| 7,003,486 B1 | 2/2006 | Condamoor |
| 7,020,626 B1 | 3/2006 | Eng et al. |
| 7,020,632 B1 | 3/2006 | Kohls |
| 7,024,632 B1 | 4/2006 | Stuart |
| 7,080,033 B2 | 7/2006 | Wilton |
| 7,113,190 B2 | 9/2006 | Heaton |
| 7,113,924 B2 | 9/2006 | Fishbain |
| 7,117,450 B1 | 10/2006 | Chaudhri |
| 7,124,110 B1 | 10/2006 | Kemp, II |
| 7,127,424 B2 | 10/2006 | Kemp, II |
| 7,130,789 B2 | 10/2006 | Glodjo |
| 7,146,336 B2 | 12/2006 | Olsen et al. |
| 7,155,410 B1 | 12/2006 | Woodmansey |
| 7,177,833 B1 | 2/2007 | Marynowski |
| 7,184,984 B2 | 2/2007 | Glodjo |
| 7,212,999 B2 | 5/2007 | Friesen et al. |
| 7,218,325 B1 | 5/2007 | Buck |
| 7,228,289 B2 * | 6/2007 | Brumfield et al. ............. 705/35 |
| 7,243,083 B2 | 7/2007 | Burns et al. |
| 7,348,981 B1 | 3/2008 | Buck |
| 7,366,691 B1 | 4/2008 | Kemp, II |
| 7,373,327 B1 | 5/2008 | Kemp, II |
| 7,389,258 B2 | 6/2008 | Brumfield |
| 7,389,264 B2 | 6/2008 | Kemp, II |
| 7,389,268 B1 | 6/2008 | Kemp, II |
| 7,392,219 B2 | 6/2008 | Singer |
| 7,403,921 B2 | 7/2008 | Tanpoco |
| 7,412,416 B2 | 8/2008 | Friesen |
| 7,418,422 B2 | 8/2008 | Burns |
| 7,426,490 B1 | 9/2008 | Borsand |
| 7,426,491 B1 | 9/2008 | Singer |
| 7,447,655 B2 | 11/2008 | Brumfield |
| 7,454,382 B1 | 11/2008 | Triplett |
| 7,461,026 B2 | 12/2008 | Schluetter |
| 2001/0032097 A1 | 10/2001 | Levey |
| 2002/0026401 A1 | 2/2002 | Hueler |
| 2002/0035534 A1 | 3/2002 | Buist et al. |
| 2002/0049666 A1 | 4/2002 | Reuter |
| 2002/0052824 A1 | 5/2002 | Mahanti |
| 2002/0052836 A1 | 5/2002 | Galperin et al. |
| 2002/0091624 A1 | 7/2002 | Glodjo |
| 2002/0138390 A1 | 9/2002 | May |
| 2002/0156718 A1 | 10/2002 | Olsen et al. |
| 2002/0169704 A1 | 11/2002 | Gilbert |
| 2003/0009419 A1 | 1/2003 | Chavez et al. |
| 2003/0023542 A1 | 1/2003 | Kemp |
| 2003/0055737 A1 | 3/2003 | Pope et al. |
| 2003/0083973 A1 | 5/2003 | Horsfall |
| 2003/0088495 A1 | 5/2003 | Gilbert et al. |
| 2003/0088509 A1 | 5/2003 | Wilton |
| 2003/0093351 A1 | 5/2003 | Sarabanchong |
| 2003/0093360 A1 | 5/2003 | May |
| 2003/0097325 A1 | 5/2003 | Friesen |
| 2003/0120591 A1 | 6/2003 | Birkhead et al. |
| 2003/0126069 A1 | 7/2003 | Cha |
| 2003/0200167 A1 | 10/2003 | Kemp |
| 2003/0225648 A1 | 12/2003 | Hylton |
| 2003/0233313 A1 | 12/2003 | Bartolucci |
| 2004/0030635 A1 | 2/2004 | Marigliano |
| 2004/0049446 A1 | 3/2004 | Seljeseth |
| 2004/0064395 A1 | 4/2004 | Mintz |
| 2004/0066414 A1 | 4/2004 | Czerwinski et al. |
| 2004/0068461 A1 | 4/2004 | Schluetter |
| 2004/0093300 A1 | 5/2004 | Burns |
| 2004/0100467 A1 | 5/2004 | Heaton |
| 2004/0103054 A1 | 5/2004 | Singer |
| 2004/0117292 A1 | 6/2004 | Brumfield |
| 2004/0143542 A1 * | 7/2004 | Magill et al. ................... 705/37 |
| 2004/0148242 A1 | 7/2004 | Liu |
| 2004/0153391 A1 | 8/2004 | Burns |
| 2004/0153392 A1 | 8/2004 | West |
| 2004/0153394 A1 | 8/2004 | West |
| 2004/0193526 A1 | 9/2004 | Singer |
| 2004/0210514 A1 | 10/2004 | Kemp |
| 2004/0210847 A1 | 10/2004 | Berson et al. |
| 2004/0236669 A1 | 11/2004 | Horst |
| 2005/0015323 A1 | 1/2005 | Myr |
| 2005/0027635 A1 | 2/2005 | Monroe |
| 2005/0075966 A1 | 4/2005 | Duka |
| 2005/0097026 A1 | 5/2005 | Morano |
| 2005/0102217 A1 | 5/2005 | Burns |
| 2005/0125327 A1 | 6/2005 | Fishbain |
| 2005/0125328 A1 | 6/2005 | Schluetter |
| 2005/0144112 A1 | 6/2005 | Singer |
| 2005/0149429 A1 | 7/2005 | Kemp |
| 2005/0154668 A1 | 7/2005 | Burns |
| 2005/0165670 A1 | 7/2005 | Woodmansey |
| 2005/0187858 A1 | 8/2005 | Graham |
| 2005/0188329 A1 | 8/2005 | Cutler et al. |
| 2005/0192887 A1 | 9/2005 | Triplett |
| 2005/0192920 A1 | 9/2005 | Hodge et al. |
| 2005/0203825 A1 | 9/2005 | Angle |
| 2005/0251475 A1 | 11/2005 | Sato |
| 2005/0256799 A1 | 11/2005 | Warsaw |
| 2005/0262003 A1 | 11/2005 | Brumfield |
| 2005/0272812 A1 | 12/2005 | Pettegrew et al. |
| 2005/0273408 A1 | 12/2005 | Bandman et al. |
| 2005/0273421 A1 | 12/2005 | Rosenthal et al. |
| 2005/0278237 A1 | 12/2005 | Dankovchik et al. |
| 2005/0283422 A1 | 12/2005 | Myr |
| 2006/0010066 A1 | 1/2006 | Rosenthal et al. |
| 2006/0015436 A1 | 1/2006 | Burns |
| 2006/0037038 A1 | 2/2006 | Buck |
| 2006/0059083 A1 | 3/2006 | Friesen |
| 2006/0080215 A1 | 4/2006 | Warsaw |
| 2006/0080223 A1 | 4/2006 | Rosenthal et al. |
| 2006/0085320 A1 | 4/2006 | Owens |
| 2006/0085741 A1 | 4/2006 | Weiner |
| 2006/0088614 A1 | 4/2006 | Pettegrew et al. |
| 2006/0129446 A1 | 6/2006 | Ruhl et al. |
| 2006/0129474 A1 | 6/2006 | Kelly |
| 2006/0129475 A1 | 6/2006 | Badenhorst et al. |
| 2006/0149654 A1 | 7/2006 | Burns |
| 2006/0155626 A1 | 7/2006 | Wigzell |
| 2006/0161495 A1 | 7/2006 | Wigzell |
| 2006/0167781 A1 | 7/2006 | Kemp |
| 2006/0195387 A1 | 8/2006 | Kemp |
| 2006/0195388 A1 | 8/2006 | Kemp |
| 2006/0195389 A1 | 8/2006 | Kemp |
| 2006/0200405 A1 | 9/2006 | Burns |
| 2006/0229971 A1 | 10/2006 | Kelly |
| 2006/0235787 A1 | 10/2006 | Burns |
| 2006/0247997 A1 | 11/2006 | West |
| 2006/0253371 A1 | 11/2006 | Rutt |

| | | |
|---|---|---|
| 2006/0253373 A1 | 11/2006 | Rosenthal et al. |
| 2006/0253377 A1 | 11/2006 | Burns |
| 2006/0259382 A1 | 11/2006 | Kemp |
| 2006/0259383 A1 | 11/2006 | Kemp |
| 2006/0259384 A1 | 11/2006 | Schluetter |
| 2006/0259395 A1 | 11/2006 | Burns |
| 2006/0259396 A1 | 11/2006 | Burns |
| 2006/0259397 A1 | 11/2006 | Schluetter |
| 2006/0259398 A1 | 11/2006 | Singer |
| 2006/0259399 A1 | 11/2006 | Mintz |
| 2006/0259400 A1 | 11/2006 | Monroe |
| 2006/0259401 A1 | 11/2006 | West |
| 2006/0259402 A1 | 11/2006 | West |
| 2006/0259403 A1 | 11/2006 | Monroe |
| 2006/0259404 A1 | 11/2006 | Brumfield |
| 2006/0259405 A1 | 11/2006 | Friesen |
| 2006/0259406 A1 | 11/2006 | Kemp |
| 2006/0259407 A1 | 11/2006 | Rosenthal et al. |
| 2006/0259409 A1 | 11/2006 | Burns |
| 2006/0259410 A1 | 11/2006 | Friesen |
| 2006/0259411 A1 | 11/2006 | Burns |
| 2006/0259412 A1 | 11/2006 | Kemp |
| 2006/0259413 A1 | 11/2006 | Friesen |
| 2006/0259414 A1 | 11/2006 | Singer |
| 2006/0265239 A1 | 11/2006 | Schluetter |
| 2006/0265240 A1 | 11/2006 | Schluetter |
| 2006/0265303 A1 | 11/2006 | Kemp |
| 2006/0265304 A1 | 11/2006 | Brumfield |
| 2006/0265305 A1 | 11/2006 | Schluetter |
| 2006/0265314 A1 | 11/2006 | Singer |
| 2006/0265315 A1 | 11/2006 | Friesen |
| 2006/0265316 A1 | 11/2006 | Brumfield |
| 2006/0265317 A1 | 11/2006 | Duquette |
| 2006/0265318 A1 | 11/2006 | Friesen |
| 2006/0265319 A1 | 11/2006 | Friesen |
| 2006/0265320 A1 | 11/2006 | Duquette |
| 2006/0265321 A1 | 11/2006 | Brumfield |
| 2006/0265322 A1 | 11/2006 | Burns |
| 2006/0265651 A1 | 11/2006 | Buck |
| 2006/0271468 A1 | 11/2006 | Rosenthal et al. |
| 2006/0271475 A1 | 11/2006 | Brumfield |
| 2006/0277136 A1 | 12/2006 | O'Connor |
| 2006/0287944 A1 | 12/2006 | Tanpoco |
| 2006/0292547 A1 | 12/2006 | Pettegrew et al. |
| 2006/0293997 A1 | 12/2006 | Tanpoco |
| 2006/0293999 A1 | 12/2006 | Tanpoco |
| 2007/0038543 A1 | 2/2007 | Weinstein |
| 2007/0038549 A1 | 2/2007 | Janowski |
| 2007/0038554 A1 | 2/2007 | Kemp |
| 2007/0038555 A1 | 2/2007 | Kemp |
| 2007/0038556 A1 | 2/2007 | Kemp |
| 2007/0038557 A1 | 2/2007 | Kemp |
| 2007/0043647 A1 | 2/2007 | Bickford |
| 2007/0078749 A1 | 4/2007 | Burns |
| 2007/0078752 A1 | 4/2007 | Burns |
| 2007/0083458 A1 | 4/2007 | Rosenthal et al. |
| 2007/0088658 A1 | 4/2007 | Rosenthal et al. |
| 2007/0100735 A1 | 5/2007 | Kemp |
| 2007/0100736 A1 | 5/2007 | Singer |
| 2007/0106590 A1 | 5/2007 | Triplett |
| 2007/0112665 A1 | 5/2007 | Mackey et al. |
| 2007/0156565 A1 | 7/2007 | Singer |
| 2007/0156570 A1 | 7/2007 | Singer |
| 2007/0226126 A1 | 9/2007 | Kirwin et al. |
| 2007/0226127 A1 | 9/2007 | Kirwin et al. |
| 2007/0294157 A1 | 12/2007 | Singla et al. |
| 2008/0059846 A1 | 3/2008 | Rosenthal et al. |
| 2008/0097887 A1 | 4/2008 | Duquette |
| 2008/0129735 A1 | 6/2008 | Buck |
| 2008/0154764 A1 | 6/2008 | Levine et al. |
| 2008/0162324 A1 | 7/2008 | West |
| 2008/0162333 A1 | 7/2008 | Kemp |
| 2008/0162378 A1 | 7/2008 | Levine et al. |
| 2008/0243709 A1 | 10/2008 | Mintz |
| 2008/0243710 A1 | 10/2008 | Borts |
| 2008/0281669 A1 | 11/2008 | Pratt |

OTHER PUBLICATIONS

System for Buying and Selling Futures and Options Transaction Terminal Operational Guidelines, Tokyo Stock Exchange, 1999.

Static Price Axis for Electronic Trading, Wit Capital Group, Digital Stock Market, Graphical User Interface Negotiations Design Document, Oct. 13, 1998, pp. 63-64.

Electronic Trading Platforms Special Report, Jeremy Carter, Risk Magazine, Nov. 1999.

Memorandum Opinion and Order of Federal Judge James B. Moran, Case No. 04 C 5312, *Trading Technologies International Inc.* v. *eSpeed Inc., eSpeed International Ltd., and Ecco Ware, Ltd.* Jun. 20, 2007 (N.D. Ill) including claim constructions for U.S. Patent No. 6,766,304 and 6,882,132.

Partial PCT Search Report PCT/US2006/043,726 WO 2007/056,553.

Partial PCT Search Report PCT/US2006/021,052 WO 2006/130,650.

Partial PCT Search Report—PCT/US2006/038,612.

Partial PCT Search Report—PCT/US2006/016,792.

International Search Report for PCT/US2005/024,590.

International Search Report for PCT/US2005/020,035.

International Search Report for PCT/US2005/039,563.

* cited by examiner

METHOD AND SYSTEM FOR PROVIDING ELECTRONIC INFORMATION FOR MULTI-MARKET ELECTRONIC TRADING

CROSS REFERENCES TO RELEATED APPLICATIONS

This application claims priority from U.S. Provisional Patent Application 60/578,225 filed Jun. 8, 2004, the contents of which are incorporated by reference.

FIELD OF THE INVENTION

This invention relates to providing electronic information over a computer network. More specifically, it relates to a method and system for providing electronic information for multi-market electronic trading.

BACKGROUND OF THE INVENTION

The trading of stocks, bonds and other financial instruments over computer networks such as the Internet has become a very common activity. In many countries of the world, such stocks, bonds and other financial instruments are traded exclusively over computer networks, completely replacing prior trading systems such as "open outcry" trading in trading pits.

Trading of stocks, bonds, etc. typically requires multiple types of associated electronic information. For example, to trade stocks electronically an electronic trader typically would like to know an asking price for a stock, a current bid price for a stock, a bid quantity, an asking quantity, current information about the company the trader is trading such as profit/loss information, a current corporate forecast, current corporate earnings, etc.

For an electronic trader to be successful, the multiple types of associated electronic information has to be supplied in real-time to allow the electronic trader to make the appropriate decisions. Such electronic information is typically displayed in multiple windows on a display screen.

In addition, when an electronic trader executes an electronic trade over a computer network, the computer network must respond to the order request in real-time in an appropriate, accurate, consistent manner. However, such electronic trade data is typically sent and received in a same data stream that supplies the multiple types of electronic information.

There are however a number of problems with electronic trading. One problem is that supplying multiple types of electronic information along with electronic trading information on the same data streams significantly increases the computations required on a target device being used by an electronic trader and by servers being used by electronic trading providers to separate the information.

Another problem is that such data streams may also include information for national as well as international markets. Desired data from such data streams needs to be accurately separated and displayed by a target device.

Another problem is that sending multiple types of electronic information over a computer network requires a large bandwidth and may significantly affect the performance of the computer network. As the performance of the computer network slows down, the flow of electronic information is also affected. Electronic traders may then not be able to make the appropriate trading decisions at the appropriate moment of time due to slow information flow.

Another problem is that displaying multiple types of electronic information in a coherent format that can be used by an electronic trader is difficult. In many instances such multiple types of electronic information are displayed in multiple windows on a computer display with multiple colors in general formats that do not meet the needs of all electronic traders.

Another problem is that most existing electronic trading systems do not allow an electronic traders to see their current positions, as well as their current profit and loss and commissions in real-time during a trading day. In most instances, such information is not available until a day following a current trading day.

Another problem is that most existing electronic trading systems do not provide the ability to display multiple types of electronic information for national and international markets in a format usable by electronic traders.

Thus, it is desirable to solve some of the problems associated with supplying multiple types of electronic information along with electronic trading information on the same data streams.

SUMMARY OF THE INVENTION

In accordance with preferred embodiments of the present invention, some of the problems with supplying multiple types of electronic information along with electronic trading information on the same data streams are overcome. A method and system for providing electronic information for multi-market electronic trading is presented.

The method and system may improve an infrastructure used by electronic traders over a computer network by splitting one or more data streams from one or more electronic trading exchanges with multiple types of electronic trading information into plural separate data streams that can be selectively requested, displayed and used by a user. The plural separate data streams and can requested, displayed and used faster and more efficiently than an entire data stream including all the multiple types of electronic trading information. Less bandwidth is required to send the separate data streams and the separate data streams require less processing power when used on a target device.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein.

DETAILED DESCRIPTION OF THE INVENTION

Figure 1:
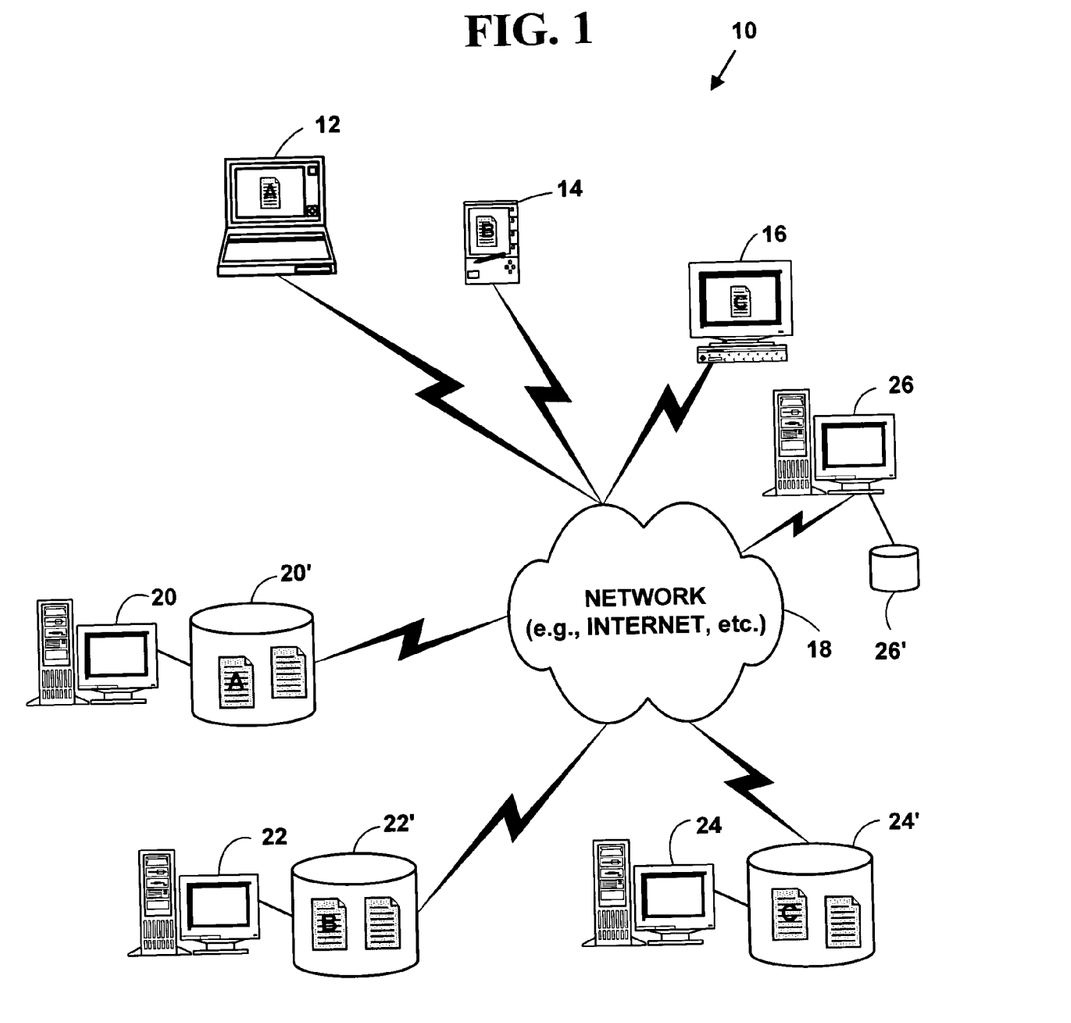
FIG. 1 is a block diagram illustrating an exemplary electronic trading system.

FIG. 1 is a block diagram illustrating an exemplary electronic trading system 10. The exemplary electronic information updating system 10 includes, but is not limited to, one or more target devices 12, 14, 16 (only three of which are illustrated). However, the present invention is not limited to these target electronic devices and more, fewer or others types of target electronic devices can also be used.

The target devices 12, 14, 16 are in communications with a communications network 18. The communications includes, but is not limited to, communications over a wire connected to the target network devices, wireless communications, and other types of communications using one or more communications and/or networking protocols.

Plural server devices 20, 22, 24 (only three of which are illustrated) include one or more associated databases 20', 22', 24'. The plural network devices 20, 22, 24 are in communications with the one or more target devices 12, 14, 16 via the communications network 18. The plural server devices 20, 22, 24, include, but are not limited to, World Wide Web servers, Internet servers, file servers, other types of electronic information servers, and other types of server network devices (e.g., edge servers, firewalls, routers, gateways, etc.).

The plural server devices 20, 22, 24 include, but are not limited to, servers used for electronic trading exchanges, servers for electronic trading brokers, servers for electronic trading information providers, etc.

The one or more target devices 12, 14, 16 may be replaced with other types of devices including, but not limited to, client terminals in communications with one or more servers, or with personal digital/data assistants (PDA), laptop computers, mobile computers, Internet appliances, two-way pagers, mobile phones, or other similar desktop, mobile or hand-held electronic devices. Other or equivalent devices can also be used to practice the invention.

The communications network 18 includes, but is not limited to, the Internet, an intranet, a wired Local Area Network (LAN), a wireless LAN (WiLAN), a Wide Area Network (WAN), a Metropolitan Area Network (MAN), a Public Switched Telephone Network (PSTN) and other types of communications networks 18.

The communications network 18 may include one or more gateways, routers, or bridges. As is known in the art, a gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another.

The communications network 18 may include one or more servers and one or more web-sites accessible by users to send and receive information useable by the one or more computers 12. The one ore more servers, may also include one or more associated databases for storing electronic information.

The communications network 18 includes, but is not limited to, data networks using the Transmission Control Protocol (TCP), User Datagram Protocol (UDP), Internet Protocol (IP) and other data protocols.

As is know in the art, TCP provides a connection-oriented, end-to-end reliable protocol designed to fit into a layered hierarchy of protocols which support multi-network applications. TCP provides for reliable inter-process communication between pairs of processes in network devices attached to distinct but interconnected networks. For more information on TCP see Internet Engineering Task Force (ITEF) Request For Comments (RFC)-793, the contents of which are incorporated herein by reference.

As is known in the art, UDP provides a connectionless mode of communications with datagrams in an interconnected set of computer networks. UDP provides a transaction oriented datagram protocol, where delivery and duplicate packet protection are not guaranteed. For more information on UDP see IETF RFC-768, the contents of which incorporated herein by reference.

As is known in the art, IP is an addressing protocol designed to route traffic within a network or between networks. IP is described in IETF Request For Comments (RFC)-791, the contents of which are incorporated herein by reference. However, more fewer or other protocols can also be used on the communications network 18 and the present invention is not limited to TCP/UDP/IP.

An operating environment for the devices of the exemplary electronic trading system 10 include a processing system with one or more high speed Central Processing Unit(s) ("CPU"), processors and one or more memories. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU-executed," or "processor-executed."

It will be appreciated that acts and symbolically represented operations or instructions include the manipulation of electrical signals by the CPU or processor. An electrical system represents data bits which cause a resulting transformation or reduction of the electrical signals or biological signals, and the maintenance of data bits at memory locations in a memory system to thereby reconfigure or otherwise alter the CPU's or processor's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM"), flash memory, etc.) mass storage system readable by the CPU. The computer readable medium includes cooperating or interconnected computer readable medium, which exist exclusively on the processing system or can be distributed among multiple interconnected processing systems that may be local or remote to the processing system.

Processing Electronic Trading Information

Figure 2:
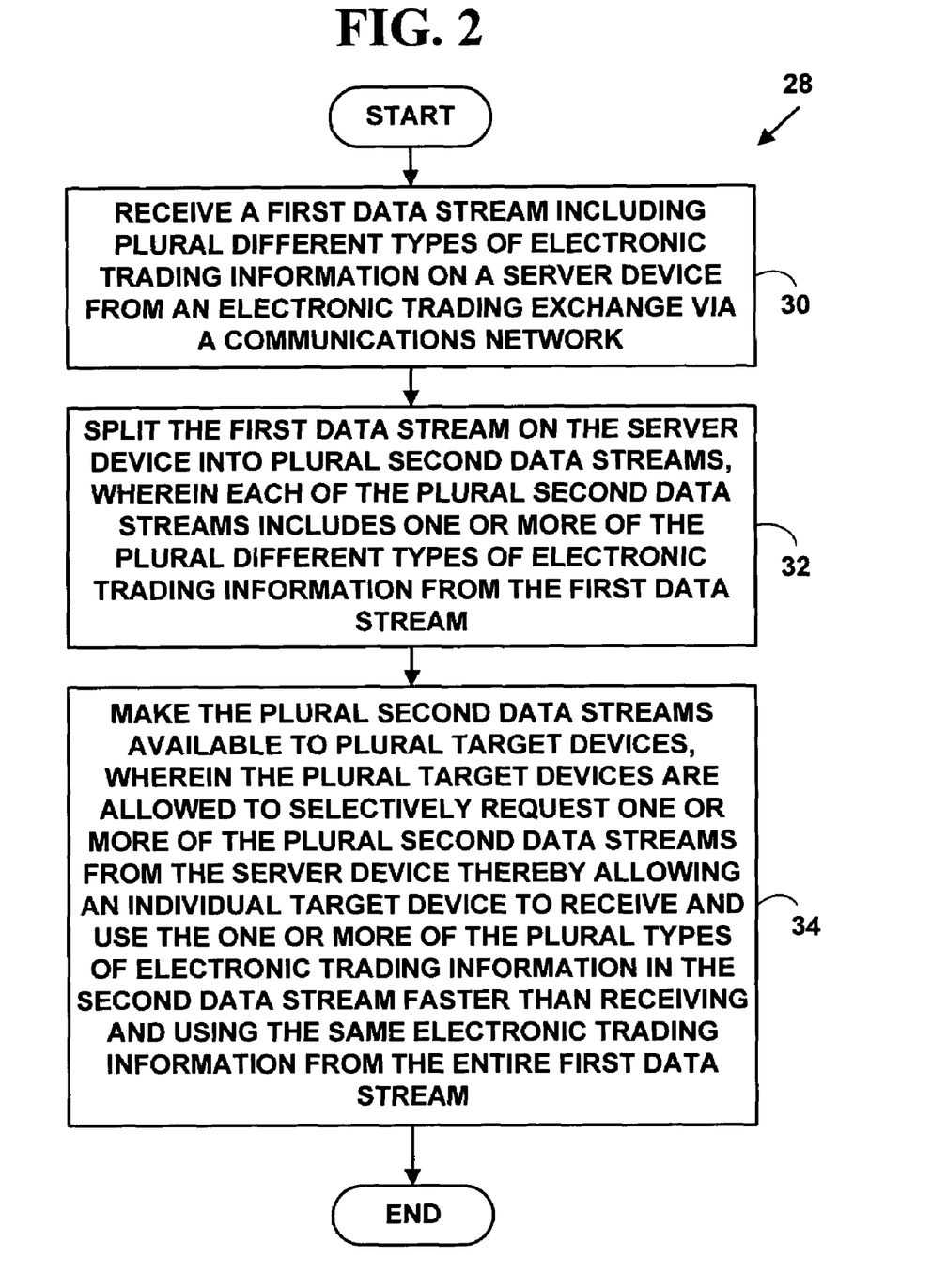
FIG. 2 is a flow diagram illustrating a method for proving electronic trading information.

FIG. 2 is a flow diagram illustrating a Method 28 for processing electronic trading information. At Step 30, a first data stream is received on a server device including plural different types of electronic trading information from an electronic trading exchange via a communications network. At Step 32, the first data stream on the server device is split into a plural second data streams. Each of the plural second data streams includes one or more of the plural different types of electronic trading information from the first data stream. At Step 34, the plural second data streams are made available to plural target devices via the server device. The plural target devices are allowed to selectively request one or more of the plural second data streams from the server device thereby allowing an individual target device to receive and use the one or more of the plural types of electronic trading information in the second data stream faster than receiving and using the same electronic trading information from the first data stream.

Method 28 is illustrated with an exemplary embodiment. However, the invention is not limited to this embodiment and other embodiments can also be used to practice the invention.

In such an exemplary embodiment at Step 30, a first data stream including plural types of electronic information related to electronic trading is received on a server device 26 from one or more electronic trading exchanges 20, 22, 24 via a communications network 18. In one embodiment of the invention the first data stream includes, but is not limited to, electronic trading information from an electronic trading exchange (e.g., New York Stock Exchange, Chicago Board of Trade, Chicago Mercantile Exchange, London Stock Exchange, Tokyo Stock Exchange, etc.).

The first data stream includes, but is not limited to, plural types of electronic information including, but not limited to, current market data, posting and canceling of order information, order fill and status information, commentary by market analysts, current market news and other types of information relevant to electronic trading sent from the electronic trading exchange.

This first data stream is provided in many different formats. One format includes a data stream with one portion of information for each data category included in the first data stream in each data packet sent across the communications network 18. Another format includes interleaving data packets in the data stream wherein each data packet includes only one type of electronic trading information. For example, a first data packet in the data stream may include only current price information for a specific financial instrument. A second data packet in the data stream may include only order fill and status information, etc. These and other formats may be used by the trading exchanges 20, 22, 24 to send out data streams.

All formats used by the electronic trading exchanges 20, 22, 24 are complex data streams that require a large number of cycles on a CPU or other processor included on a target device 12, 14, 16. Such a complex data stream therefore is very slow to receive, process, display and./or other use on the target device 12, 14, 16. The server device 26 accepts these and other complex data stream formats and splits the electronic trading information contained therein into the plural second data streams that are more manageable, easier and more effect to receive, use and display on the target devices 12, 14, 16.

At Step 32, the first data stream on the server device 26 is split into a plural second data streams. Each of the plural second data streams includes one or more of the plural different types of electronic trading information from the first data stream. For example, the first data stream including current market data, posting and canceling of order information, order fill and status information is split into plural separate data streams with one of the plural second data streams including only current market data, another one of the plural second data streams including only posting and canceling of order information, yet another one of the plural second data streams including only order fill and status information, etc.

At Step 34, the plural second data streams are made available to the plural target device 12, 14, 16 via the server device 26. The plural target devices 12, 14, 16 are allowed to selectively request one or more of the plural second data streams from the server device 26 thereby allowing an individual target device 12, 14, 16 to receive and use the one or more of the plural types of electronic trading information in the second data stream faster and more efficiently than receiving and using the same electronic trading information from the entire first data stream.

For example, a target device 12 may request one of the plural data streams relating only to current market data, while another target device 14 may request two plural data streams relating to posting and canceling of order information and order fill and status information, etc. Since a target device 12, 14, 16 can select only the individual data streams from plural second data streams that are desired, the target device 12, 14, 16 is able to receive and use the selected data streams from the plural data steams instead of receiving and processing the entire first data stream including all of the plural types of electronic trading information.

Using selected ones of the plural second data streams requires a smaller bandwidth to send the data stream over the communications network 18 to the target devices 12, 14, 16. Using selected ones of the plural second data streams also requires less processing cycles for a processor or CPU on a target device 12, 14, 16. Therefore, a user of target device 12, 14, 16 can make electronic trading decisions quicker.

Figure 3:
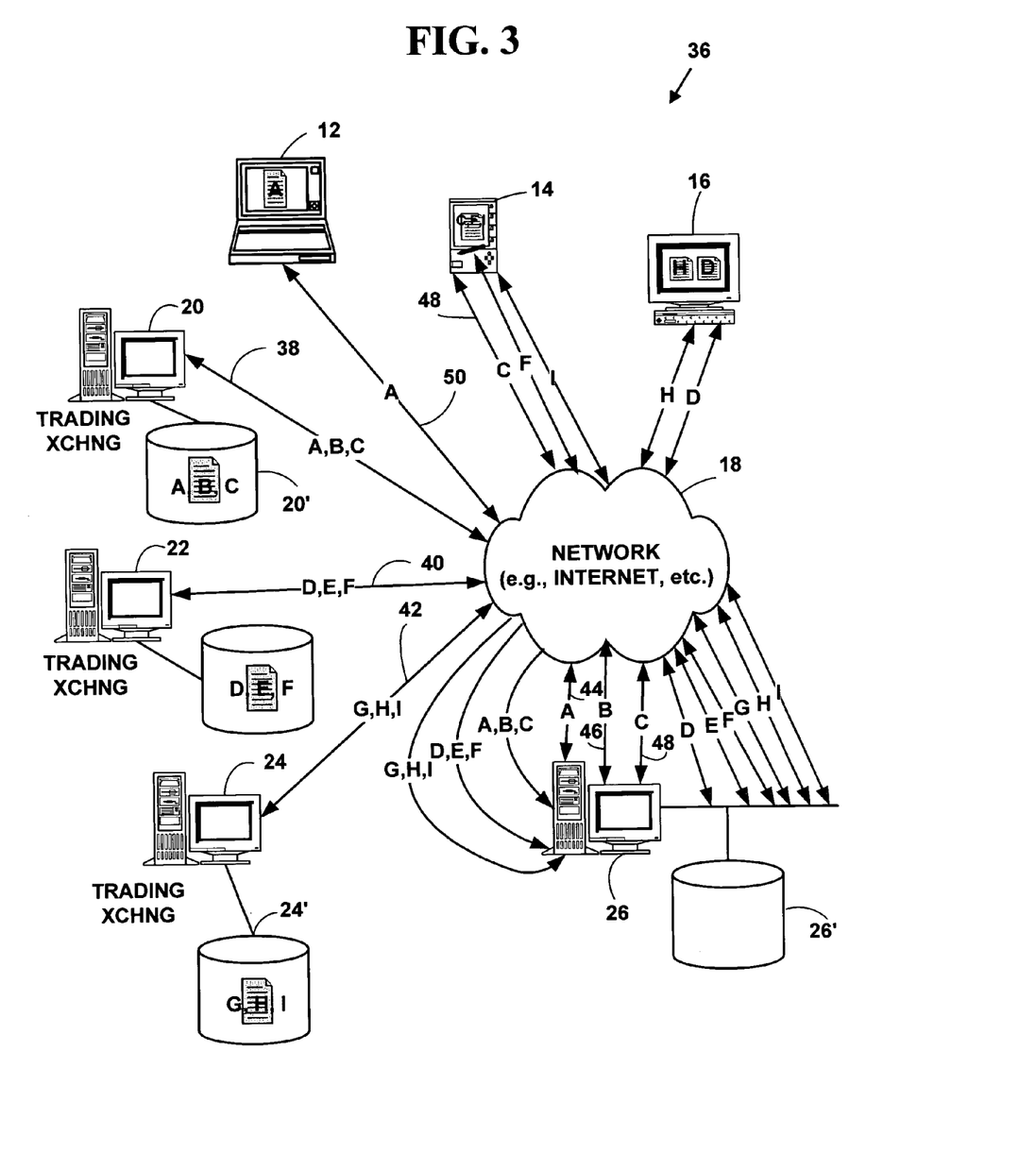
FIG. 3 is a block diagram illustrating a data flow for the method of FIG. 2.

In one embodiment, the one server device 26 is specifically configured for and optimized for receiving the first data stream 38, for splitting the first data stream 38 into the plurality of second data streams 44, 46, 48 and receiving requests from the plurality of target devices 12, 14, 16 and selectively sending the requested information to the plurality of target devices 12, 14, 16.

In other embodiments, plural server devices can be used instead of the one server device 26. In such other embodiments each of the plural server devices are specifically configured for and optimized executing one, or more than one, of the steps of Method 28.

Method 28 is illustrated with processing one first data stream from one trading exchange. However, the present invention is not limited to such an embodiment and Method 28 can also be used to split plural first data streams into plural sets of plural second data streams.

FIG. 3 is a block diagram illustrating a data flow 36 for Method 28. At Step 30, a first data stream 38 is received on a server device 26 including plural different types of electronic trading information A, B, C from an electronic trading exchange 20 via a communications network 18. At Step 32, the first data stream 38 is split into plural second data streams 44, 46, 48 on the server device 26. Each of the plural second data streams 44, 46, 48 includes one or more of the plural types of electronic trading information from the first data stream. At Step 34, the plural second data streams 44, 46, 48 are made available via the server device 26 to plural target devices 12, 14, 16. The plural target devices 12, 14, 16 are allowed to selectively request one or more of the plural second data streams 44, 46, 48 from the server device 26 thereby allowing an individual target device 12, 14, 16 to receive and use the one or more of the plural types of electronic trading information in the second data streams 44, 46, 48 faster than receiving and using the same electronic trading information from the first data stream 38. For example, target device 12 may request only one individual data stream 50 from the server device 26 that corresponds to data stream A 44 from the electronic trading exchange server 20. Similarly target device 14 may request, three data streams C, F and I from three different trading exchanges 20, 22, 24 and target device 16 may request only two data streams C and H from trading exchange 22 and 24.

In FIG. 3, the exemplary electronic trading exchanges are illustrated as providing only three different types of electronic trading information in a data stream for simplicity. An actual first data stream from the electronic trading exchanges 20, 24, 26 typically includes many more than three different type of electronic trading information.

Figure 4:
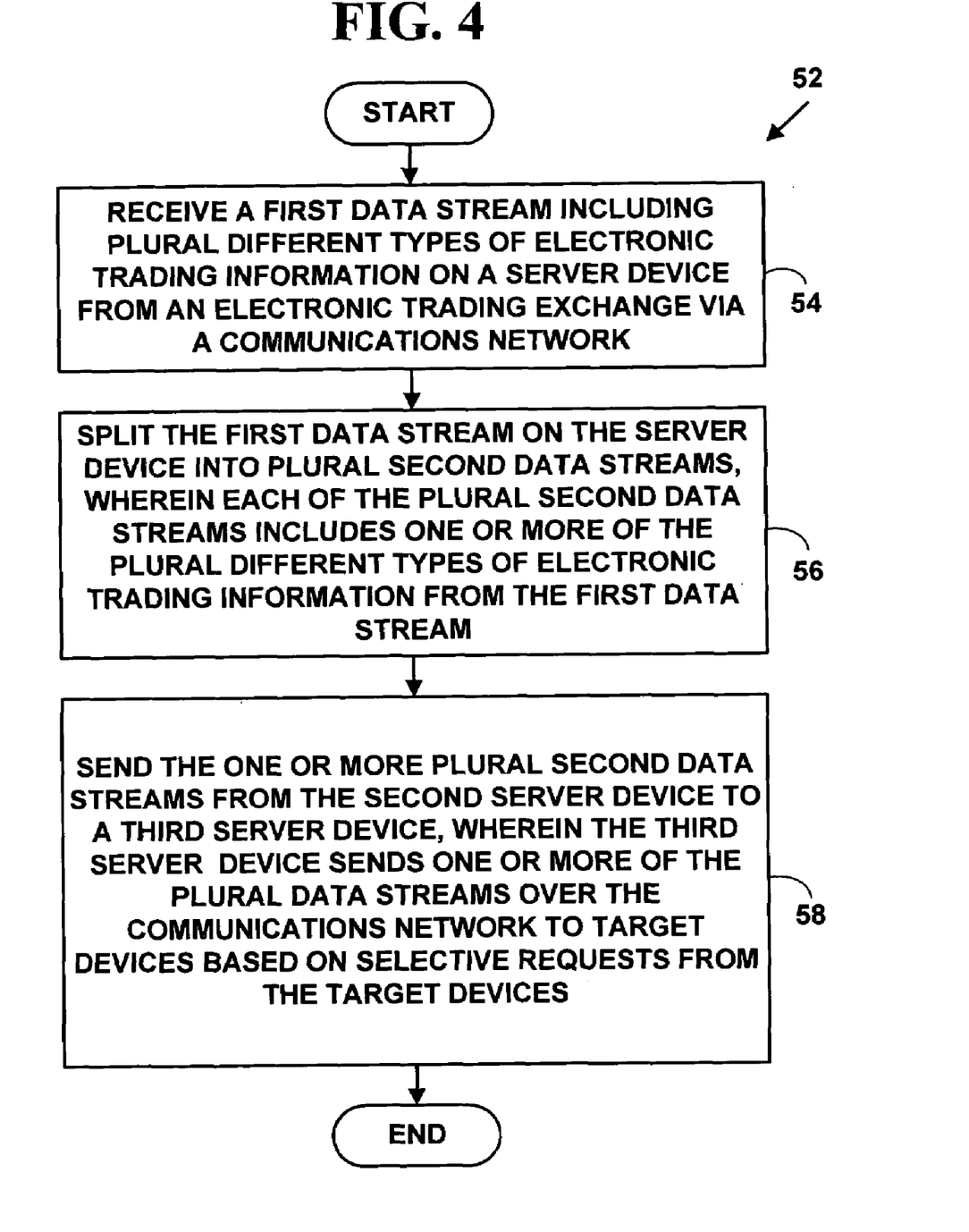
FIG. 4 is flow diagram illustrating a method for processing electronic trading information.

FIG. 4 is flow diagram illustrating a Method 52 for processing electronic trading information. At Step 54, a first data stream including plural types of electronic information related to electronic trading is received on a first server device from an electronic trading exchange via a communications network. At Step 56, the data stream is sent to a second server device and split into plural second data streams where each of the plural second data streams includes one or more of the plural types of electronic information from the first data stream. At Step 58, one or more of the plural second data streams are sent from the second server device to a third server device. The third server device sends one or more of the plural data streams over the communications network to target devices based on selective requests from the target devices.

Figure 5:
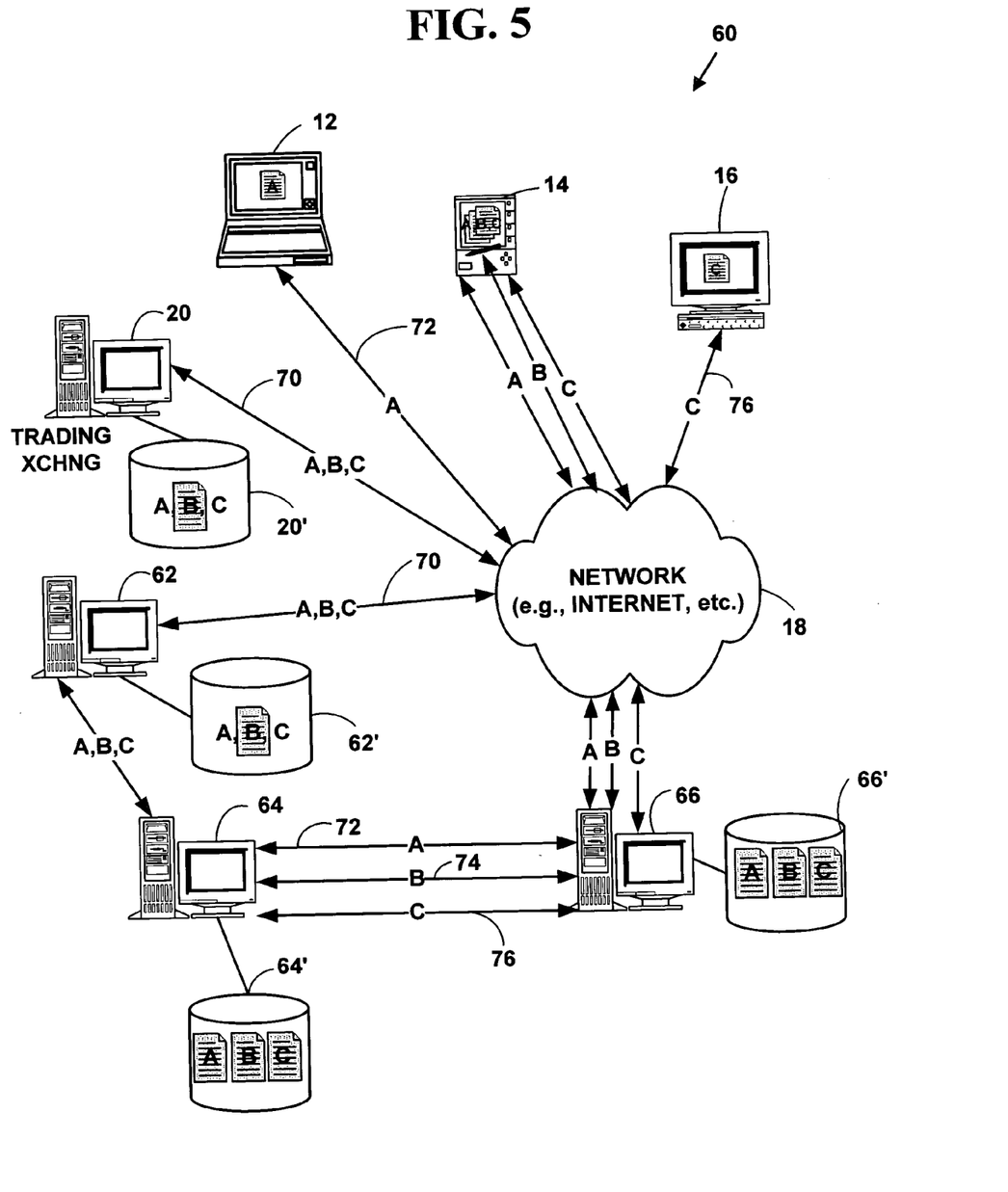
FIG. 5 is a block diagram illustrating a data flow for the method of FIG. 4.

FIG. 5 is a block diagram illustrating a data flow 60 for Method 52. Data flow 60 illustrates one electronic trading exchange 20 and three servers 62, 64, 66.

Method 52 is illustrated with an exemplary embodiment. However, the invention is not limited to this embodiment and other embodiments can also be used to practice the invention.

In such an exemplary embodiment at Step 54, a first data stream 70 including plural types of electronic information related to electronic trading is received on a first server device 62 from an electronic trading exchange 20 via a communications network 18. The first server device 62 is specifically configure for and optimized for receiving the first data stream 70 from the communications network 18.

At Step 56, the first data stream 70 is sent to a second server device 64 and split into plural second data streams 72, 74, 76 where each of the plural second data streams includes one or more of the plural types of electronic information from the first data stream 70. The second server device 64 is specifically configured for and optimized for splitting the first data stream 70.

At Step 58, one or more of the plural second data streams 72, 74, 76 are sent from the second server device 64 to a third server device 66. The third server device 66 makes the plural second data streams 72, 74, 76 available to the plural target devices 12, 14, 16 and sends one or more of the plural data streams 72, 74, 76 over the communications network 18 to a target device 12, 14, 16 based on selective requests from the target device. The third server device 66 is specifically configured for and optimized for receiving requests from the target devices 12, 14, 16 and selectively sending the requested information to the target devices 12, 14, 16 via the communications network 18.

Method 52 is illustrated with three server devices. However, Method 52 can be practiced with more or fewer server devices and the present invention is not limited to three server devices. Method 52 is also illustrated with one communications network 18. Method 52 can also be practiced with more than one communications network including both public and private communications network portions.

Method 52 also allows target devices 12, 14, 16 to selectively receive one or more of the plural second data streams based on selective requests. Thus, the information in the one or more plural data streams is received faster and is more easily and efficiently adapted to a user's preferences (e.g., an electronic trader) using the target devices 12, 14, 16. Method 52 also allows for quicker sending and receiving of electronic trading orders as they are placed and filled.

Displaying Electronic Trading Information from Plural Data Streams

Figure 6:
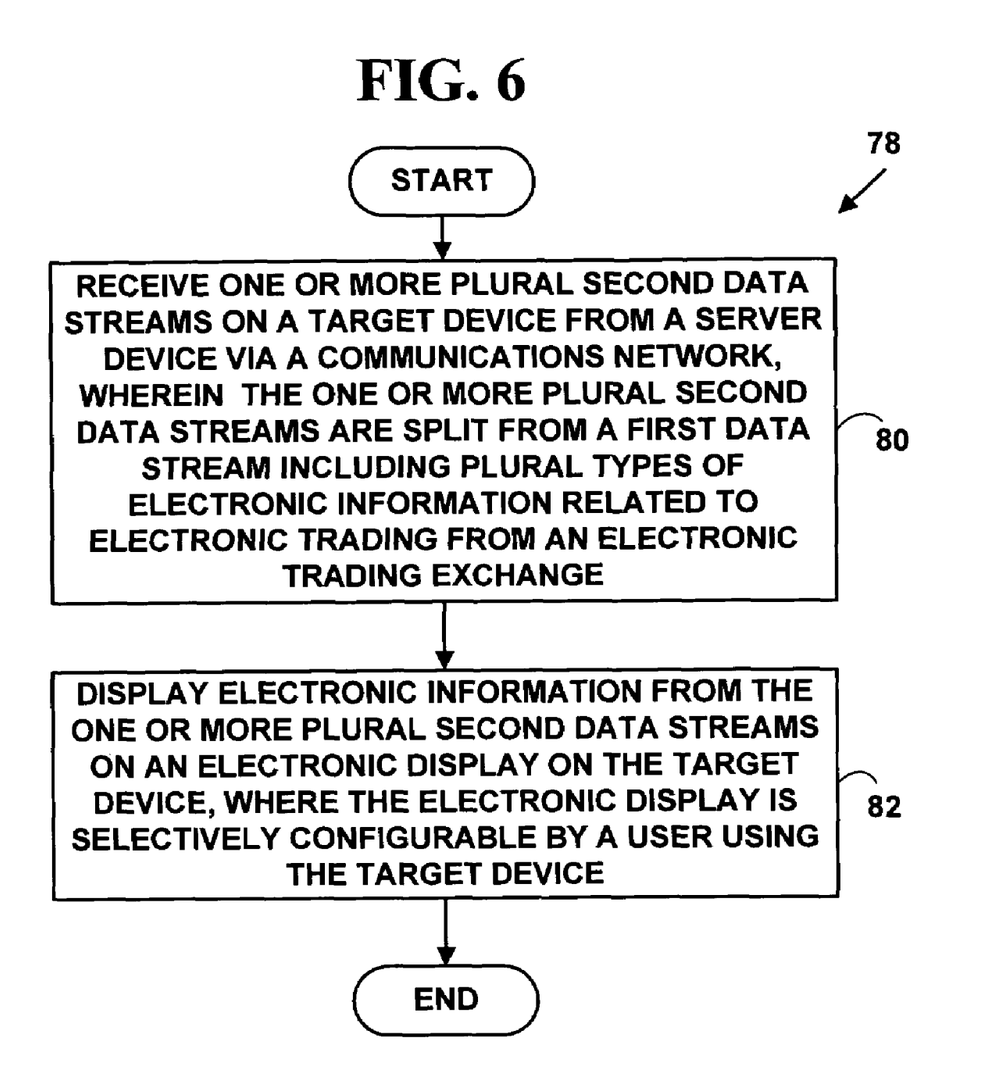
FIG. 6 is a flow diagram illustrating a method for displaying electronic trading information from plural data streams.

FIG. 6 is a flow diagram illustrating a Method 78 for displaying electronic trading information from plural data streams. At Step 80, one or more plural second data streams are received on a target device from a server device via a communications network. The one or more plural second data streams were split from a first data stream including plural types of electronic information related to electronic trading from an electronic trading exchange. At Step 82, electronic information from the one or more plural second data streams are displayed on an electronic display on the target device. The electronic display is selectively configurable by a user using the target device based on selected ones of the plural second data streams selected by a user.

Method 78 is illustrated with an exemplary embodiment. However, the invention is not limited to this embodiment and other embodiments can also be used to practice the invention.

In such an exemplary embodiment at Step 80, one or more plural second data streams 44, 46, 48 are received on a target device 12, 14, 16 from a server device 26 via a communications network 18. The one or more plural second data streams 44, 46, 48 were split from a first data stream 38 including plural types of electronic information related to electronic trading from an electronic trading exchange 20.

At Step 82, electronic information from the one or more plural second data streams 44, 46, 48 are displayed on an electronic display on the target device 12, 14, 16. The electronic display is selectively configurable by a user using the target device based on selected ones of the plural second data streams selected by a user. For example, a user may configure a window-X for one of the selected plural second data streams, a window-Y for another one of the selected plural second data streams 44, 46, 48, etc. where each window, X, Y, etc. includes specific characteristics configured by the user (e.g., size, shape, color, etc.).

In one embodiment of the present invention, the plural second data streams 40, 42, 44 are displayed in multiple windows on the electronic display. The multiple windows, include, but are not limited to, a positions window, a market watcher window, a trade window and other types of windows displaying information relevant to electronic trading using information from the plural second data streams 44, 46, 48.

Table 1 illustrated an exemplary positions window that is displayed on the electronic display of a target device 12, 14, 16 using one of the plural second data streams 44 related to market positions.

TABLE 1

| Issue | Position | P&L | Price | Commission |
|---|---|---|---|---|
| usg 10Y | 1 | 225 | 111-14 | 54 |
| 10Y Dec03 FT | 100 | 288 | 113-18 | 24 |
| Total | | 513 | | 78 |

Table 2 illustrates an exemplary market watcher window that displays cash and futures pricing information using another one of the plural second data streams 46 related to cash and futures pricing.

TABLE 2

| Issue | BidPrice | BidQty | AskPrice | AskQty |
|---|---|---|---|---|
| usg 10Y | 111-145 | 5 | 111-14 | 42 |
| 10Y Dec03 FT | 113-19 | 60 | 113-18 | 32 |

Table 3 illustrates an exemplary trade window that displays information about a current day's trades using another one of the plural second data streams 48 related to cash and futures pricing.

TABLE 3

| Desc. | Price | Quan. | Side | Time | Facility | Type | TradeID | Price32 |
|---|---|---|---|---|---|---|---|---|
| usg 10Y | 100.4838 | 1 | Sell | 7:05:33 | A | Cash | SA43217 | 100-15.5 |
| usg 10Y | 100.4838 | 1 | Sell | 11:04.18 | A | Cash | SA43217 | 100-15.5 |
| usg 10Y | 10.4537 | 1 | Sell | 11:10:15 | A | Cash | BA43217 | 100-14.5 |
| 10Y DEC 03 FT | 113.5313 | 1 | Sell | 17:10:43 | A/C/E | Future | 2858590 | 113-17 |
| 10Y Dec03 FT | 113.5313 | 1 | Sell | 17:11:29 | A/C/E | Future | 28585090 | 113-17 |
| 10Y Dec03 FT | 113.5625 | 1 | Sell | 13:05:58 | A/C/E | Future | 28522090 | 113-18 |

The information illustrated in Tables 1-3 are exemplary only. Other types of electronic information in other formats can also be used and the invention is not limited to the electronic information displayed that is obtained from the plural second data streams 44, 46, 48.

Methods 28, 52 and 78 can be used to provide real-time notification and display of electronic cash and futures trades, real-time calculation of profit and loss (P&L) marked to market, including commissions, real-time calculation of positions, ability for a trader to manually enter and edit voice trades or possible trades, to alter P&L positions and simple viewing, searching and printing of day trades.

The electronic information from the plural second data stream can also be dumped into and displayed directly from electronic spreadsheets such as Mircosoft Excel and other electronic spreadsheets.

In another embodiment of the invention, an interface (e.g., a web-page) is provided on a server device 26 on the communications network 18 allows a user to login and view electronic trading information related to their own electronic trading activities. The electronic information is obtained from the plural second data streams 44, 46, 48.

It should be understood that the architecture, programs, processes, methods and It should be understood that the architecture, programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. §112, paragraph 6, and any claim without the word "means" is not so intended.

Therefore, all embodiments that come within the scope and spirit of the following claims and equivalents thereto are claimed as the invention.

We claim:

1. A method for processing electronic trading information, comprising:

receiving a first data stream including a plurality of different types of electronic trading information on a server device from an electronic trading exchange via a communications network;

splitting the first data stream on the server device into a plurality of second data streams in real-time, wherein each of the plurality of second data streams includes one or more of the plurality of different types of electronic trading information from the first data stream; and making the plurality of second data streams available in real-time to a plurality of target devices via the server devices, thereby allowing the plurality of target devices to selectively request one or more of the plurality of second data streams from the server device in real-time and allowing an individual target device to receive and use the one or more of the plurality of types of electronic trading information in the plurality of second data streams for electronic trading faster and more efficiently than receiving and using the same electronic trading information from the entire first data stream device, wherein the individual target device is able to receive selected ones of the plurality of second date streams using less bandwidth from the server device and wherein processing the selected ones of the plurality of second data streams on the target device requires less processing cycles than processing the entire first data stream including all of the plurality of types of electronic trading information.

2. The method of claim 1 further comprising a computer readable medium having stored therein one or more processors to execute the steps of the method.

3. The method of claim 1 wherein the first data stream includes electronic trading information comprising: current market data, posting and canceling of order information, order fill and status information, commentary by market analysts, or current market news.

4. The method of claim 1 wherein the server device includes a plurality of server devices.

5. The method of claim 1 wherein the communications network includes a portion of a public communications network and a portion of a private communications network.

6. The method of claim 5 wherein the portion of the public communications network includes Internet, a public switched telephone network (PSTN) or a wide area network (WAN).

7. The method of claim 5 wherein the portion of the private communications network includes an intranet or a local area network (LAN).

8. The method of claim 1 wherein the plurality of target network devices include desktop computers, laptop computers, mobile phones, stationary phones, personal information devices, Internet appliances, personal digital/data assistants (PDA) or two-way pagers.

9. The method of claim 1 wherein the server device is specifically configured for and optimized for receiving the first data stream, for splitting the first data stream into the plurality of second data streams and receiving requests from the plurality of target devices and selectively sending requested data streams from the plurality of second data streams to the plurality of target devices.

10. A method for processing electronic trading information, comprising:

receiving a first data stream including a plurality different types of electronic trading information on a first server device from an electronic trading exchange via a communications network;

sending the first data stream from the first server device to a second server device;

splitting the first data stream on the second server device into a plurality of second data streams in real-time, wherein each of the plurality of second data streams includes one or more of the plurality of different types of electronic trading information from the first data stream; and sending the plurality second data streams from the second server device to a third server device in real-time, wherein the third server device allows a plurality of target devices to selectively request one or more of the plurality of second data streams, thereby allowing a target device to receive and use the one or more of the plurality of types of electronic trading information for electronic trading in the second data stream faster than receiving and using the same electronic trading information from the entire first data stream, wherein the individual target device is able to receive selected ones of the plurality of second data streams using less bandwidth from the third server device and wherein processing the selected ones of the plurality of second data streams on the target device requires less processing cycles than processing the entire first data stream including all of the plurality of types of electronic trading information.

11. The method of claim 10 further comprising a computer readable medium having stored therein one or more processors to execute the steps of the method.

12. The method of claim 10 wherein the first data stream includes electronic trading information comprising: current market data, posting and canceling of order information, order fill and status information, commentary by market analysts, or current market news.

13. The method of claim 10 wherein the plurality of target network devices include desktop computers, laptop computers, mobile phones, stationary phones, personal information devices, Internet appliances, personal digital/data assistants (PDA) or two-way pagers.

14. The method of claim 10 wherein the first server device is specifically configured for and optimized for receiving the first data stream, the second server device is specifically configured for and optimized for splitting the first data stream and the third server device is specifically configured for and optimized for receiving requests from the plurality of target devices and selectively sending the requests from the plurality of target devices and selectively sending requested data streams from the plurality of second data streams to the plurality of target devices.

15. A method for displaying electronic trading information from a plurality of data streams, comprising:

receiving one or more data streams from a plurality of second data streams on a target device from a server device via a communications network, wherein the one or more of a plurality of second data streams are split in real-time from a first data stream including a plurality of types of electronic information related to electronic trading from one or more electronic trading exchanges; and displaying electronic trading information from the one or more of the plurality of second data streams on an electronic display on the target device in real-time, wherein the electronic display is selectively configurable by a user using the target device for electronic trading based on the selected ones of the plurality of second data streams selected, wherein the target device is able to receive selected ones of the plurality of second data streams using less bandwidth from the server device and wherein processing and displaying the selected ones of the plurality of second data streams on the target device requires less processing cycles than processing and displaying the entire first data stream including all of the plurality of types of electronic trading information.

16. The method of claim 15 further comprising a computer readable medium having stored therein one or more processors to execute the steps of the method.

17. The method of claim 15 wherein the first server device is specifically configured for and optimized for receiving the first data stream, the second server device is specifically configured for and optimized for splitting the first data stream and the third server device is specifically configured for and optimized for receiving requests from the plurality of target devices and selectively sending the requests from the plurality of target devices and selectively sending requested data streams from the plurality of second data streams to the plurality of target devices.

18. The method of claim 15 wherein the server device includes a plurality of server devices.

19. An electronic trading information processing system, comprising in combination:

a receiving means for receiving a plurality of first data streams including a plurality different types of electronic trading information from a plurality of different electronic trading exchanges via a communications network in real-time;

a splitting means for splitting the plurality of first data streams into a plurality of second data streams in real-time, wherein each of the plurality of second data streams includes one or more of the plurality of different types of electronic trading information from the plurality of first data streams; and a selection means for making available the plurality of the second data streams in real-time and for allowing a plurality of target devices to selectively request one or more of the plurality of second data streams in real-time, thereby allowing an individual target device to receive and use the one or more of the plurality of types of electronic trading information in the plurality of second data streams faster than receiving and using the same electronic trading information from an entire first data stream, wherein the individual target device is able to receive selected ones of the plurality of second data streams in real-time using less bandwidth from selection means and wherein processing the selected ones of the plurality of second data streams on the target device requires less processing cycles than processing the entire first data stream including all of the plurality of different types of electronic trading information.

20. The electronic trading information processing system of claim 19 further comprising:

a display means for graphically displaying the plurality of types of electronic trading information from the plurality of second data streams on a target device.

21. An electronic trading information processing system, comprising in combination:

a first module for receiving a first data stream including a plurality of different types of electronic trading information on a server device from an electronic trading exchanges via a communications network;

a second module for splitting the first data stream on the server device into a plurality of second data streams in real-time, wherein each of the plurality of second data streams includes one or more of the plurality of different types of electronic trading information from the first data stream; and a third module for allowing a plurality of target devices to selectively request one or more of the plurality of second data streams from the server device thereby allowing an individual target device to receive and use the one or more of the plurality of types of electronic trading information in the second data stream faster and more efficiently than receiving and using the same electronic trading information from the entire first data stream, wherein the individual target device is able to receive selected ones of the plurality of second data streams using less bandwidth from the server device and wherein processing the selected ones of the plurality of second data streams on the target device requires less processing cycles than processing the entire first data stream including all of the plurality of different types of electronic trading information.

22. The electronic trading information processing system of claim 21 further comprising a fourth module for graphically displaying the plurality of types of electronic trading information from the plurality of second data streams on a target device.

* * * * *

UNITED STATES PATENT AND TRADEMARK OFFICE
CERTIFICATE OF CORRECTION

PATENT NO. : 7,555,456 B2  
APPLICATION NO. : 11/147949  
DATED : June 30, 2009  
INVENTOR(S) : Leslie Rosenthal and Robert Collins Page 1 of 2

It is certified that error appears in the above-identified patent and that said Letters Patent is hereby corrected as shown below:

IN THE CLAIMS:

Please correct the following typing errors in Claim 1:

1. A method for processing electronic trading information, comprising:

receiving a first data stream including a plurality of different types of electronic trading information on a server device from an electronic trading exchange via a communications network; splitting the first data stream on the server device into a plurality of second data streams in real-time, wherein each of the plurality of second data streams includes one or more of the plurality of different types of electronic trading information from the first data stream; and making the plurality of second data streams available in real-time to a plurality of target devices via the server ~~devices~~ device, thereby allowing the plurality of target devices to selectively request one or more of the plurality of second data streams from the server device in real-time and allowing an individual target device to receive and use the one or more of the plurality of types of electronic trading information in the plurality of second data streams for electronic trading faster and more efficiently than receiving and using the same electronic trading information from the entire first data stream ~~device~~, wherein the individual target device is able to receive selected ones of the plurality of second date streams using less bandwidth from the server device and wherein processing the selected ones of the plurality of second data streams on the target device requires less processing cycles than processing the entire first data stream including all of the plurality of types of electronic trading information.

Signed and Sealed this  
Thirtieth Day of August, 2011

David J. Kappos  
*Director of the United States Patent and Trademark Office*

CERTIFICATE OF CORRECTION (continued)
U.S. Pat. No. 7,555,456 B2

IN THE CLAIMS:

Please correct the following typing errors in Claim 19:

19. An electronic trading information processing system, comprising in combination: a receiving means for receiving a plurality of first data streams including a plurality different types of electronic trading information from a plurality of different electronic trading exchanges via a communications network in real-time; a splitting means for splitting the plurality of first data streams into a plurality of second data streams in real-time, wherein each of the plurality of second data streams includes one or more of the plurality of different types of electronic trading information from the plurality of first data streams; and a selection means for making available the plurality of the second data streams in real-time and for allowing a plurality of target devices to selectively request one or more of the plurality of second data streams in real-time, thereby allowing an individual target device to receive and use the one or more of the plurality of types of electronic trading information in the plurality of second data streams faster than receiving and using the same electronic trading information from an entire first data stream, wherein the individual target device is able to receive selected ones of the plurality of second data streams in real-time using less bandwidth from the selection means and wherein processing the selected ones of the plurality of second data streams on the target device requires less processing cycles than processing the entire first data stream including all of the plurality of different types of electronic trading information.

UNITED STATES PATENT AND TRADEMARK OFFICE
CERTIFICATE OF CORRECTION

PATENT NO. : 7,555,456 B2  
APPLICATION NO. : 11/147949  
DATED : June 30, 2009  
INVENTOR(S) : Leslie Rosenthal and Robert Collins It is certified that error appears in the above-identified patent and that said Letters Patent is hereby corrected as shown below:

IN THE CLAIMS:

Column 9, line 66 - Column 10, line 41,

Please correct the following typing errors in Claim 1:

1. A method for processing electronic trading information, comprising:

receiving a first data stream including a plurality of different types of electronic trading information on a server device from an electronic trading exchange via a communications network; splitting the first data stream on the server device into a plurality of second data streams in real-time, wherein each of the plurality of second data streams includes one or more of the plurality of different types of electronic trading information from the first data stream; and making the plurality of second data streams available in real-time to a plurality of target devices via the server ~~devices~~ device, thereby allowing the plurality of target devices to selectively request one or more of the plurality of second data streams from the server device in real-time and allowing an individual target device to receive and use the one or more of the plurality of types of electronic trading information in the plurality of second data streams for electronic trading faster and more efficiently than receiving and using the same electronic trading information from the entire first data stream ~~device~~, wherein the individual target device is able to receive selected ones of the plurality of second data streams using less bandwidth from the server device and wherein processing the selected ones of the plurality of second data streams on the target device requires less processing cycles than processing the entire first data stream including all of the plurality of types of electronic trading information.

This certificate supersedes the Certificate of Correction issued August 30, 2011.

Signed and Sealed this  
Eleventh Day of October, 2011

David J. Kappos  
*Director of the United States Patent and Trademark Office*

CERTIFICATE OF CORRECTION (continued)
U.S. Pat. No. 7,555,456 B2

IN THE CLAIMS:

Column 12, lines 33-62,

Please correct the following typing errors in Claim 19:

19. An electronic trading information processing system, comprising in combination: a receiving means for receiving a plurality of first data streams including a plurality different types of electronic trading information from a plurality of different electronic trading exchanges via a communications network in real-time; a splitting means for splitting the plurality of first data streams into a plurality of second data streams in real-time, wherein each of the plurality of second data streams includes one or more of the plurality of different types of electronic trading information from the plurality of first data streams; and a selection means for making available the plurality of the second data streams in real-time and for allowing a plurality of target devices to selectively request one or more of the plurality of second data streams in real-time, thereby allowing an individual target device to receive and use the one or more of the plurality of types of electronic trading information in the plurality of second data streams faster than receiving and using the same electronic trading information from an entire first data stream, wherein the individual target device is able to receive selected ones of the plurality of second data streams in real-time using less bandwidth from the selection means and wherein processing the selected ones of the plurality of second data streams on the target device requires less processing cycles than processing the entire first data stream including all of the plurality of different types of electronic trading information.